(12) United States Patent
Iinuma

(10) Patent No.: US 6,411,690 B1
(45) Date of Patent: Jun. 25, 2002

(54) DISPLAY OBJECT SELECTION SYSTEM

(75) Inventor: Shuichi Iinuma, Tokyo (JP)

(73) Assignee: Kabushiki Kaisha Infocity, Tokyo (JP)

( * ) Notice: Subject to any disclaimer, the term of this patent is extended or adjusted under 35 U.S.C. 154(b) by 0 days.

(21) Appl. No.: 09/141,307

(22) Filed: Aug. 27, 1998

(51) Int. Cl.⁷ .............................................. H04M 11/00
(52) U.S. Cl. ............................ 379/102.02; 379/93.17; 379/110.01
(58) Field of Search .................. 348/14–20; 379/93.17, 379/93.23, 102.01, 102.02, 102.03, 202, 110.01; 345/158, 169, 760–763

(56) References Cited

U.S. PATENT DOCUMENTS

| | | | | |
|---|---|---|---|---|
| 5,949,474 A | * | 9/1999 | Gerszberg et al. | 348/14.01 |
| 5,963,245 A | * | 10/1999 | McDonald | 348/14 |
| 5,999,207 A | * | 12/1999 | Rodriguez et al. | 348/14 |
| 6,097,375 A | * | 8/2000 | Byford | 345/169 |

FOREIGN PATENT DOCUMENTS

| | | |
|---|---|---|
| JP | 4-48745 | 4/1992 |
| JP | 6319173 | 11/1994 |

* cited by examiner

*Primary Examiner*—Binh Tieu
*Assistant Examiner*—George Eng
(74) *Attorney, Agent, or Firm*—Notaro & Michalos P.C.

(57) ABSTRACT

The keypad 23 of a remote selection device 20 is operated to select a display object displayed on the monitor 3 of a processor unit 2. In response to the selection, the infrared ray emission unit 22 transmits an infrared ray signal. The infrared ray signal receiving unit 6 of the processor unit 2 receives the signal, and then the telephone function unit 4 calls up to a corresponding party. After the session established, telephone conversation is made using the microphone unit 26 and speaker unit 27 of the remote selection device 20.

5 Claims, 6 Drawing Sheets

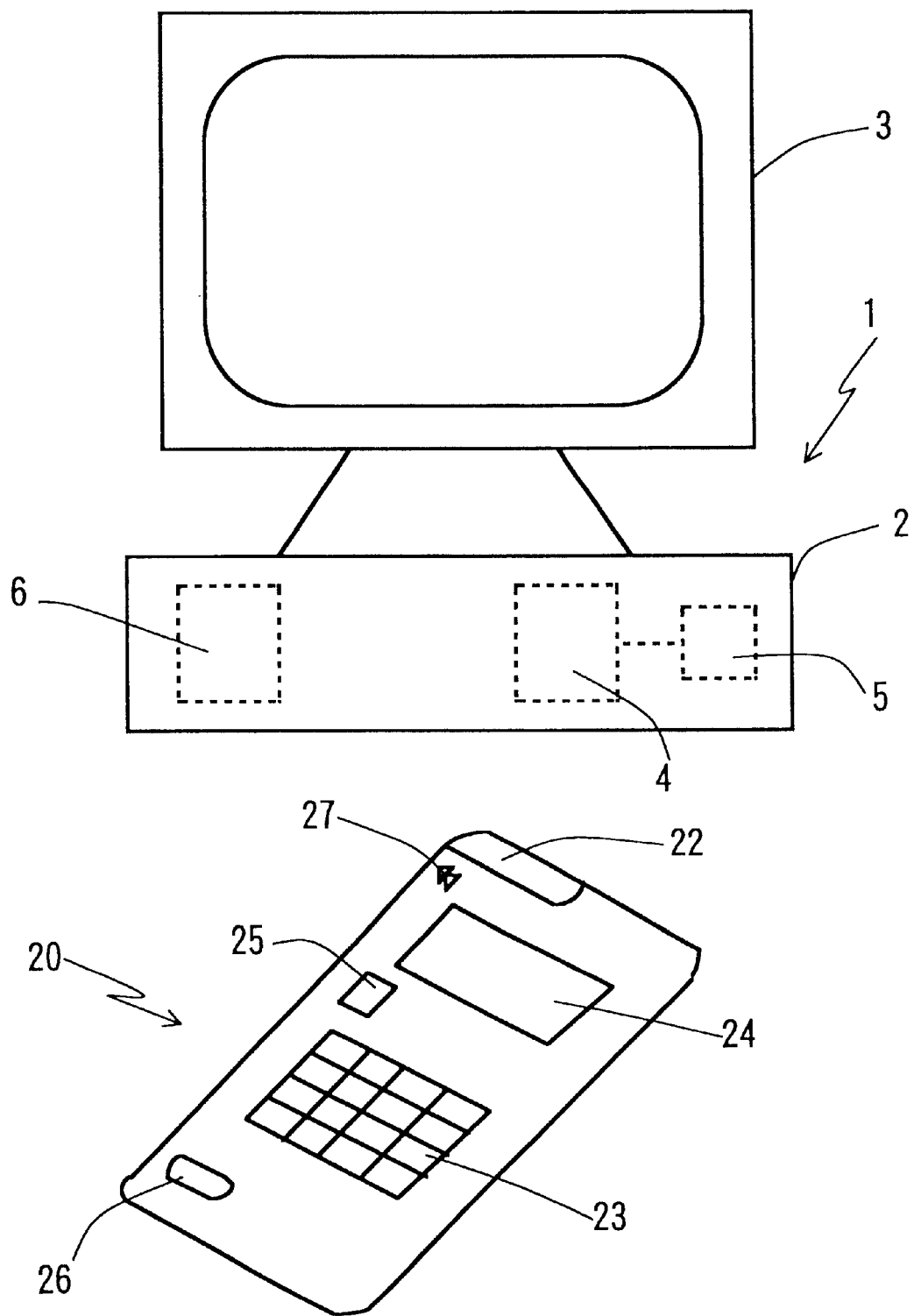
F I G. 1

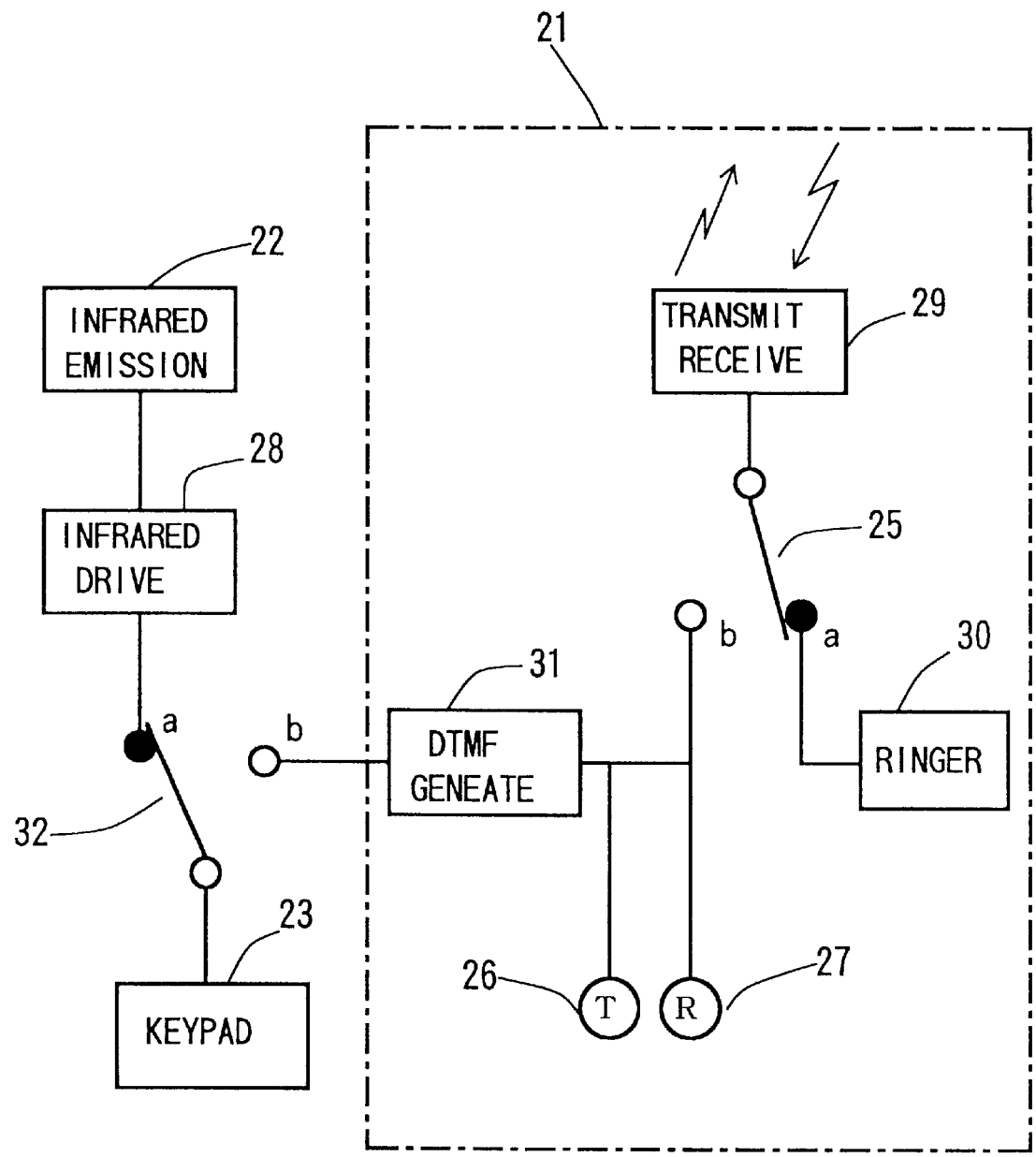
F I G. 3

INSURANCE MAIL ORDER

①ORDER CALL
(PLEASE CLICK)

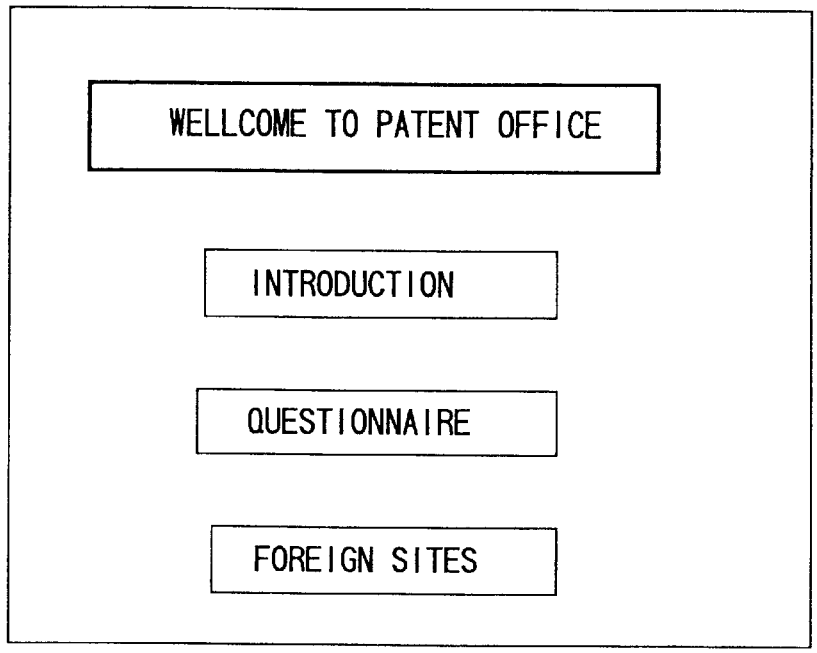
F I G. 5
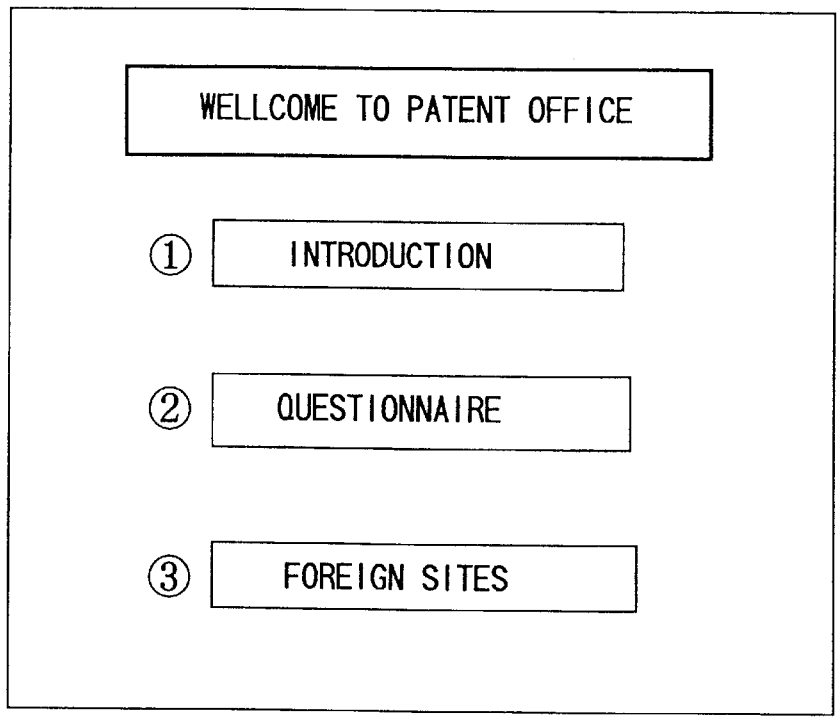
F I G. 6

DISPLAY OBJECT SELECTION SYSTEM

BACKGROUND OF THE INVENTION

This invention relates to a display object selection system for selecting an object appearing on a display screen.

A user sometimes calls a telephone by specifying the corresponding display object on a display screen in the home or the office. For instance, it is very convenient to make a telephone call to a party by selection of a corresponding display object on a browsed web page. More specifically, while a user is accessing a web page or home page of a mail order trader, the user clicks a certain display area on the web page to call up a person in charge of the mail order service, and then makes an order to the person over the phone.

There is another example, in which a call destination list is displayed on a screen with a phone directory file, and then a user selects a certain display area to call up a corresponding person.

By the way, when a user selects a display object on a screen of a personal computer, the user is not necessarily close to the personal computer. The user sometimes feels more comfortable to be far from the personal computer, when the user need not manipulate the keyboard, mouse device, or the like inputting device. Moreover, when the user selects among display objects on the display screen of a television set, the user may prefer to select them by means of a remote selection device.

When the user selects a display object to call up a party using a personal computer, a television set, or a like system remote from the user, it is remarkably difficult to talk over the telephone.

For instance, when the user call up by selecting a display object on the display screen of the personal computer and uses the telephone function of the personal computer, the user usually talks over the telephone with a microphone and a speaker both attached to the personal computer. However, when the user selects among display objects by using an infrared ray device or the like remote control device, the user is away from the microphone and the speaker. Therefore, the user feels uncomfortable to talk over the telephone with noise.

JPUUA(Japanese Published Unexamined Utility Model Application) H4-48745 and JPUPA(Japanese Published Unexamined Patent Application) H6-319173 disclose a related technology. These publications disclose a configuration in which a remote control device of a television set also has a function of a telephone set.

SUMMARY OF THE INVENTION

The purpose of the present invention is accordingly to enable a user to talk over a telephone without any trouble when the user selects among display objects on a display screen away from the display screen by a remote selection device.

According to the present invention, to achieve the above-mentioned purpose, a display object selection device separate from a main system, for selecting one or more display objects displayed on a display device of the main system comprises: means for transmitting a wireless signal to the main system to specify a display object displayed on the display device; microphone means for transmitting an audio signal over a telephone line established based on the specified display object by the wireless signal; and, speaker means for receiving an audio signal over the telephone.

In this configuration, even when a display object on a display screen is selected from a remote place by a wireless signal, it is possible to talk over a telephone with the speaker/microphone means both equipped on the remote selection device, and avoid from the problems caused by a surrounding noise, etc.

The wireless signal can be an infrared ray signal.

The remote selection device can further comprise voice input means for receiving voice of a user and generating the wireless signal based on the voice thus received. The voice input means can be a the microphone means equipped on the remote selection device. The voice input means can be designed to receive information other than one used for specifying the display object on the display device as well.

The telephone function can be implemented into the display device of the main system, and the display object selection device can be designed to have a cordless handset function of the telephone function.

Further, the display object selection device can be designed to receive from the main system the telephone number corresponding to the selected display object, and make a call to the corresponding party.

BRIEF DESCRIPTION OF THE DRAWINGS

FIG. 1 illustrates the whole configuration of a preferred embodiment of the present invention.

FIG. 3 is a block diagram showing main portions of the display object selection device of the preferred embodiment.

FIG. 5 illustrates the appearance of the display screen before symbols are added.

FIG. 6 illustrates the appearance of the display screen after the symbols are inserted.

DESCRIPTION OF THE PREFERRED EMBODIMENT

Figure 2:
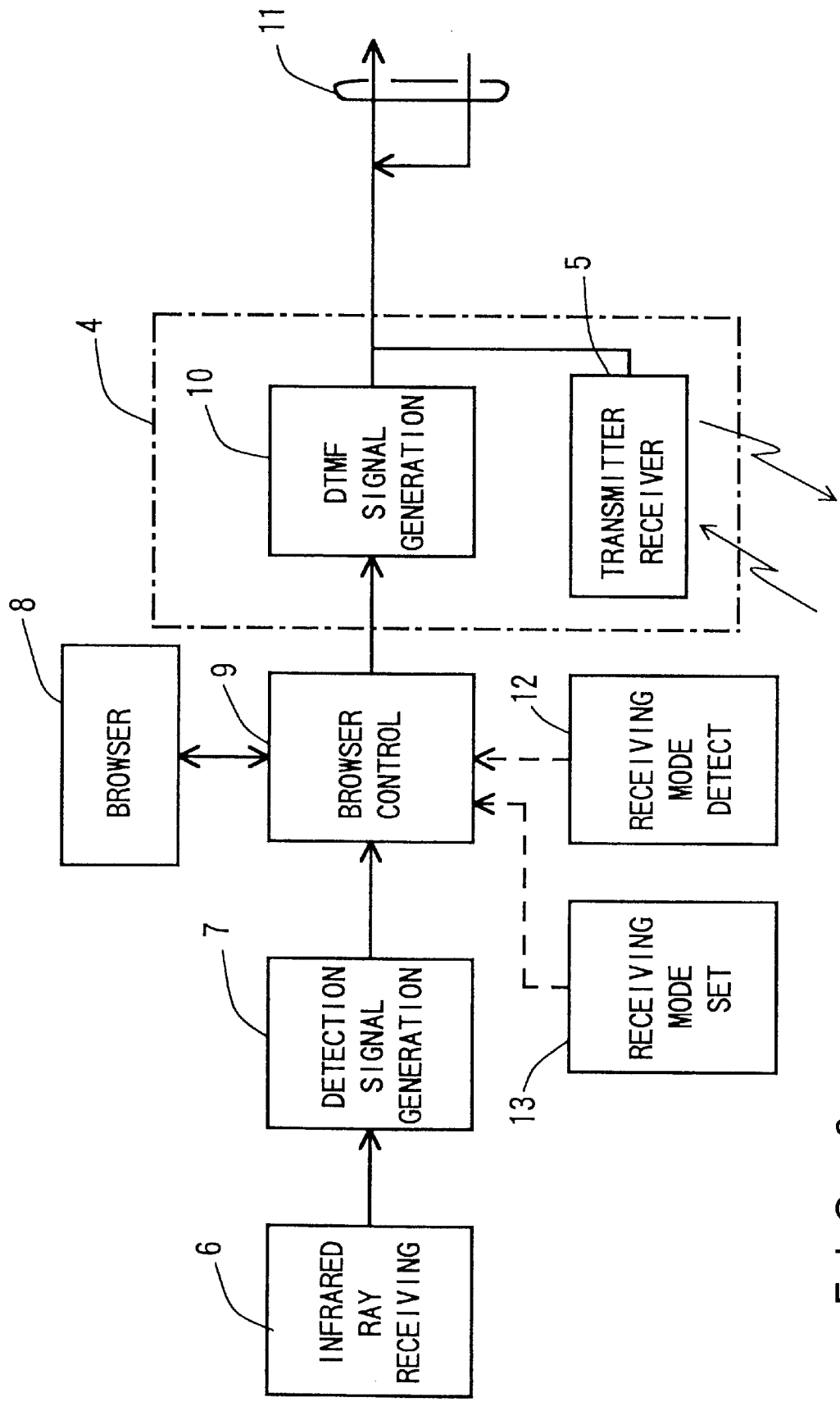
FIG. 2 illustrates main portions of functional blocks of the computer system of the preferred embodiment.

An embodiment of the information system according to the present invention is now described with reference to the attached drawing. In this embodiment, content data written in a hyper-text format is displayed by a browser, and the displayed image has symbols such as numerals, alphabets around selection areas, which are in turn selected by operating the corresponding keys of a remote selection device. The technique for displaying the symbols will be described in detail later.

FIG. 1 shows the whole configuration of the embodiment, wherein a personal computer 1 has a processor unit 2, a monitor 3 and other I/O devices (not shown). The processor unit 2 has a telephone function unit 4, a transmitter-receiver unit 5 for the telephone function unit 4, and an infrared ray receiver unit 6 among others. Telephone function unit 4 is connected with an external telephone line 11 (refer to FIG. 2). The transmitter-receiver 5 of the telephone function unit 4 communicates a signal with a transmitter-receiver unit 29 of a cordless handset function unit 21 (refer to FIG. 3) implemented within a remote selection device 20 which is described later. The infrared ray receiving unit 6 receives an infrared ray emitted from the infrared ray emission unit 22 of the remote selection device 20. The infrared ray is indicative of a selection signal from the remote selection device 20.

The remote selection device 20 is designed to select a display object on the monitor 3 of the personal computer 1, and also works as a cordless handset of the telephone function unit 4 of the processor unit 2. The telephone function unit 4 works as a base unit of a cordless telephone system.

The remote selection device 20 can be configured depending on a selection method of display objects. In this embodiment, as described before, numerals or other symbols are displayed around selection areas, and a selection object is selected by depressing the corresponding key on the remote selection device 20. Accordingly, the remote selection device 20 is designed to transmit a signal corresponding to the key operation to the personal computer 1, and the remote selection device 20 may be configured like a conventional remote control device for a television set is. The remote selection device 20 has, for instance, a cordless handset function unit 21 (FIG. 3), an infrared ray emission unit 22, a key pad 23, a display unit 23, a talk switch (hook switch) 25, a microphone unit 26, and a speaker unit 27 among others. An internal circuit arrangement of the remote selection device 20 is fully described later with reference to FIG. 3. The signal corresponding to the key operation is transmitted from the infrared ray transmission unit 22.

Of course, the combination of some arrow keys and a fixation key can be used to select a display object. In this case, the cursor displayed on the monitor 3 is moved to a selection area by the arrow keys and the selected position is fixed by the fixation key.

FIG. 2 shows an arrangement implemented in the processor unit 2. This arrangement receives an infrared ray signal, selects a display object responsively, and performs an operation corresponding to the selection.

Referring to FIG. 2, an infrared ray receiving unit 6 receives an infrared ray signal and supplies it to a detection signal generation circuit 7, which in turn generates a corresponding key-code signal. The key-code signal corresponds to one of the keys (labeled with numerals, alphabets, or other symbols) of the remote selection device 20. The key-code signal is sent to a browser 8 through a browser control unit 9, and is used to select a display object. In response to the selection of the display object, one or more operations are performed on the browser 8 depending on the design of the content data. When the selected display object corresponds to a telephone number, the data as to the telephone number is supplied to a DTMF (dial tone multi-frequency) signal generation circuit 10 of the telephone function unit 4 through the browser control unit 9, and the call to the corresponding telephone number is done. The numeral reference 11 indicates a telephone line.

FIG. 3 shows the internal circuit arrangement of the remote selection device 20, wherein the remote selection device 20 has a cordless handset function unit 21, an infrared ray emission unit 22, a keypad 23, and an infrared ray emission driving unit 28 among others. The cordless handset function unit 21 has a transmitter-receiver unit 29 which communicates signals with the transmitter-receiver unit 5 of the processor unit 2. The transmitter-receiver unit 29 is connected with a ringer circuit 30 through a talk switch 25. The talk switch 25 is usually switched to the ringer circuit 30 through the usually closed contact (labeled with "a"). The talk switch 25 is also connected with a microphone unit 26, a speaker unit 27, and a DTMF signal generation circuit 31 at the usually open contact (labeled with "b"). And, the keypad 23 is connected with the DTMF signal generation circuit 31 through the switch 32. The infrared ray emission driving unit 28 is connected with the keypad 23 through the switch 32.

In order to talk over the telephone, the switch 25 is switched to the break contact side "b". The switch 32 synchronizes with the switch 25 and is switched to the break contact side. Then, the transmitter-receiver unit 29 receives a signal from the transmitter-receiver unit 5 of the processor unit 2, and the speaker 27 generates voice in response to the received signal.

Moreover, in order to call up, the keypad 23 is operated such that the DTMF signal generation circuit 31 generate a dial signal. The dial signal is sent to a telephone switching system through the switch 25, the transmitter-receiver unit 29, the transmitter-receiver unit 5, FIG. 2, and the telephone line 11, FIG.2.

On the other hand, when switch 32 which synchronizes with switch 25, is switched to the contact "a" side, the infrared ray emission unit 22 supplies the infrared rays signal to the processor unit 2 in response to the operation onto the keypad 23.

When a call signal is supplied from outside through the telephone function unit 4 of the processor unit 2, FIG.2, the transmitter-receiver unit 5, FIG.2, the other the transmitter-receiver unit 29, and the switch 25, the ringer circuit 30 generates a ringing tone.

Next, the operation of the preferred embodiment is described.

Figure 4:
FIG. 4 illustrates the operation of the preferred embodiment.
Figure 4:
Figure 4:

Now, a web page for mail order of insurance is displayed on the monitor as shown in FIG. 4. In this situation, in order to make an order of favorite insurance, it is requested to select a corresponding number to call up a person in charge and also to talk to the person over the telephone. In order to select a numeral indication corresponding to the favorite insurance, the user depresses the corresponding numeral key of the remote selection device 20. The infrared ray emission unit 22 accordingly emits an infrared ray in a corresponding manner. The infrared ray receiving unit 6 of the processor unit 2 receives that ray and the detection signal generation circuit 7 detects the selected numeral. A certain software working on the processor unit 2 causes the telephone function unit 4 to call up the telephone number corresponding to the detected numeral, and a telephone call session is accordingly established.

When the cordless handset function unit 21 of the remote selection device 20 is made ready for telephone communication by operation of the talk switch 25, the user can talk over the telephone to the person in charge at the other party side directly by using the microphone unit 26 and the speaker unit 27 of the remote selection device 20 immediately after the telephone session is established by the telephone function unit 4.

In the preferred embodiment described above, the remote selection device 20 has the keypad 23 by which a user can call up directly. However, alternatively, the remote selection device 20 can be only equipped without the call up function or the DTMF generation unit. In that alternative configuration, the user calls up with only the telephone function unit 4 of the processor unit 2.

Contrarily, the processor unit 2 can be equipped without the telephone function unit 4. In this case, the remote selection device 20 has a telephone function, and receives telephone number information from the processor unit 2 to call up to the corresponding party automatically. The remote selection device 20 can receive a hyper text document including the telephone number information to call up the corresponding party. of course, the processor unit 2 and the remote selection device 20 can both have a telephone function.

Moreover, the present invention can be applied to any situation in which another type of information terminal than the personal computer is used to call up. The information terminal can be a so-called internet television set which has a television function, an internet browser function, and a tele-communication function.

Moreover, the microphone unit 26 of the remote selection device 20 can be used as a microphone of the processor unit 2. The microphone unit 26 can then be used for data and command entry to the processor unit 2, using a speech recognition technique. In this case, the voice input from the telephone unit 26 is used to select the display object occasionally, and used for conventional data and command entry, etc. occasionally. In this case, the input mode can be set by an operation of a certain key or a certain voice input. A setting method of the input mode is described in detail later.

Moreover, the speaker unit 27 of the remote selection device 20 can be used as a speaker of the processor unit 2.

While the selection of a symbol on a browser window, according to this embodiment design, causes a call up, a conventional click operation or an equivalent operation to a certain display area can be designed to cause a call up as well.

Next, a technique for displaying symbols such as numerals or alphabets at selection areas of a browser screen is described.

Now, a method of automatically inserting symbols, as shown in FIG. 6, into a plain display screen shown in FIG. 5 is described.

In this method, content data described in HTML are analyzed to detect display objects or anchor positions to be selected, and serial numbers or other like symbols are displayed at the detected positions. Of course, the HTML document can contain symbols.

Figure 7:
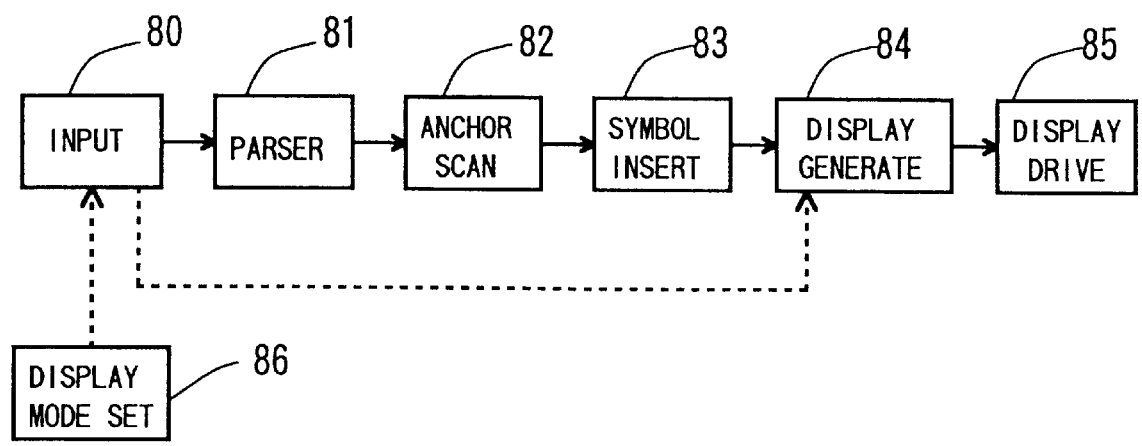
FIG. 7 illustrates an arrangement for inserting the symbols to the display appearance.

FIG. 7 shows an arrangement (the browser 8 in FIG. 2) for displaying content data written in HTML, and, for instance, this arrangement is implemented as software of the processor unit 2.

Referring to FIG. 7, an input unit 80 passes the content data to a parser 81 which in turn analyzes the sentence structure of the content data. An analysis result is then passed to an anchor scanning unit 82 which in turn detects anchors. A symbol insertion unit 83, in response to the detected anchors, inserts serial numbers at the corresponding text positions, and sends the processed content data to a display data generation unit 84. The display data generation unit 84 supplies the display data to display driving unit 85 which in turn drives the monitor 3.

In operation, the web page shown in FIG. 5 is changed to one shown in FIG. 6. Although a user conventionally goes ahead to a linked destination by clicking a display area marked with anchor tags, the user also does the same by inputting a symbol located at the corresponding position by means of the remote selection device 20.

Neither the anchor scanning unit or the symbol insertion unit 83 are included in a conventional browser 8. Those functions can be implemented into the browser 8, or alternatively, implemented separate from the browser 8.

Further, as shown with the broken lines, a display mode selection unit 86 can be provided for setting a display mode, which causes the input unit 80 to pass the content data directly to the display data generation unit 84 and accordingly disables the insertion of numerals. Thus, the display becomes the conventional one. The user can select the display mode depending on the situation and the favor.

Next, the control of the input mode is explained. The arrangement of FIG. 2 can have a data receiving mode detecting unit 12 and a data receiving mode setting unit 13 installed as shown with the broken lines. The data receiving mode detection unit 12 determines whether to use input data for the selection of display objects or to use it as in a conventional manner, depending on the position of the cursor (caret, focus, or other data entry position indicia).

An example is a case where a display object is selected at first to move a cursor into a data entry box. Then a user is requested to enter some data in the data entry box.

When the cursor is located outside the data entry area, inputted data is used to select a display object. In response to the selection of the display object, the cursor moves into the data entry area. The data receiving mode detection unit 12 detects that the position of the cursor is within the data entry box, and then the data inputted by the user after then is received as conventional data.

The data receiving mode setting unit 13 compulsorily sets the data receiving mode. For instance, the receiving mode detection unit 12 detects that the mode is in the conventional data receiving mode when the cursor is located in the data entry box. As it is, the display object cannot be selected by inputting a numeral or a like symbol. Then, the data receiving mode is compulsorily changed into the mode in which a display object is selected by inputting a numeral etc. For instance, the data receiving mode setting unit 13 causes the cursor to move outside of the data entry box. The data receiving mode setting unit 13 can inversely change the mode from display object selection to conventional data entry. The data receiving mode setting unit 13 can actuated for example by operating a certain key of the remote selection device 20.

Figure 8:
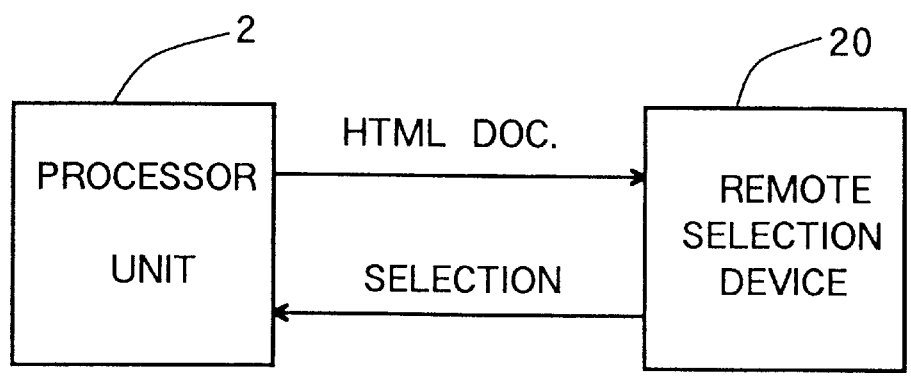
FIG. 8 illustrates an alternative configuration of the preferred embodiment.

FIG. 8 illustrates an alternative arrangement, in which, the remote selection unit 20 exchanges information with the processor unit 2 using wire or wireless communication. The remote selection unit 20 receives a hyper-text document of display contents from the processor unit 2, and displays the document on its own display unit using its own browser function. The browser function is newly added to the remote selection unit 20. The area of the display unit 24 is preferably designed to be sufficiently large so that the details can be seen. The browser function can be designed to transform the document so that the user can comprehend the document using the relatively small display area. The symbols for selection of display objects should be displayed on the display unit 24.

The user selects a display object displayed on the screen by operating a corresponding key of the keypad 23 of the remote selection device 20. Of course, display objects can be selected directly on the display unit 24 using a touch panel technology, and the information as to the selection of the display object is sent to the processor unit 2.

In summary, technical features of the preferred embodiment is described in brief.

The display object selection device illustrated with the description of the embodiment is separate from a main system, and arranged to select one or more display objects displayed on a display device of the main system. The display object selection device comprises: means for transmitting a wireless signal to the main system to specify a display object displayed on the display device; microphone means for transmitting audio signals over a telephone line established based on the specified display object by the wireless signal; and speaker means for receiving audio signals over that telephone line.

In this configuration, it is possible to talk over the telephone using the speaker and microphone means equipped to the display selection device, even immediately after the remote selection of the display object which causes a corresponding telephone call.

The wireless signal for the selection can be an infrared ray signal. The display object selection device can further comprise voice input means for receiving voice of the user and for generating the wireless signal based on the voice thus received. The voice input means can be composed of the microphone means. The voice input means can be designed to receive information other than one used for specifying the display object on the display device. The telephone function can be implemented into the display device of the main system, and the display object selection device can be designed to have a cordless handset function of the telephone function.

Further, the display object selection device can be designed to receive from the processor unit the telephone number corresponding to the selected display object, and make a call to the corresponding party.

Next, the display system illustrated with the description of the embodiment comprises: means for displaying display objects to be selected on a display area based on content data; means for displaying symbols at positions corresponding to the display objects; means for receiving symbol data; and means for selecting a display object based on the received symbol data.

In this configuration, the display object can be easily selected by inputting symbol data. Because the symbols can be easily input even by a conventional remote controller, it is the best for the operation at the remote position from the screen.

The symbol data can be supplied by a wireless signal. The content data can be a hyper text document. In this case, the symbols can be displayed at corresponding positions to areas marked up by anchor tags. The symbols can be displayed nearly to or superimposed over the display objects to be selected.

The display system can further comprise: means for determining whether or not the symbol data is to be used for selection of display objects; and means responsive to the determination for enabling the selection of the display objects using the symbol data. The selection of the display objects using the symbol data can be enabled based on a certain event.

The alternative display object selection device illustrated with the description of the embodiment comprises: means for receiving from the main system, information to be displayed on the display unit of the main system; means for displaying at least a portion of the information; means for selecting a display object thus displayed; and means for supplying information corresponding to the selected display object.

In this configuration, the display object can be easily selected too. The information can be a hypertext document.

What is claimed is:

1. An information processing system having a telephone function comprising:

a main system including a display device; and, a display object selection device separate from the main system for transmitting a wireless signal to the main system to select one display object from among at least two display objects displayed on the display device, the main system further having:

means for receiving content data;
means for displaying display objects on the display device based on the content data;
means for scanning the content data to identify one or more display objects to be selected by a user;
means for generating data for displaying symbols corresponding to the identified display objects to be selected by the user, the data for displaying the symbols being not originally included in the content data;
means for displaying the symbols at positions corresponding to the identified display objects to be selected by the user based on the data for displaying symbols;
means for receiving a wireless signal indicative of a symbol from the display selection device;
means for specifying one display object based on the received wireless signal indicative of the symbol; and,
telephone function for establishing a telephone line based on the specified one display object, and the display object selection device further having:
means for inputting a symbol data;
means for transmitting the wireless signal indicative of a symbol to the main system;
microphone means for transmitting audio signals to the main system for transmitting in turn over the telephone line established based on the specified one display object; and,
speaker means for receiving audio signals from the main system received over the telephone line established based on the one display object.

2. A display object selection system comprising:

means for receiving content data;
means for displaying display objects on a display area based on the content data;
means for scanning the content data to identify one or more display objects to be selected by a user;
means for generating data for displaying symbols corresponding to the identified display objects to be selected by the user, the data for displaying the symbols being not originally included in the content data;
means for displaying the symbols at positions corresponding to the identified display objects to be selected by the user based on the data for displaying symbols;
means for receiving symbol data; and,
means for selecting a display object based on the received symbol data.

3. A display object selection system as claimed in claim 2, wherein the content data is formatted in Hypertext Markup Language.

4. A display object selection system as claimed in claim 3, wherein the means for generating the data for displaying the symbols generates the data for displaying the symbols upon anchor information.

5. An information processing system comprising:

a main system including a display device; and, a display object selection device separate from the main system for transmitting a wireless signal to the main system to select one display object from among at least two display objects displayed on the display device, the wireless signal being indicative of a symbol placed in association with the one display object,
the main system further having:
means for receiving content data:
means for displaying display objects on the display device based on content data;

means for scanning the content data to identify one or more display objects to be selected by a user;

means for generating data for displaying symbols corresponding to the identified display objects to be selected by the user, the data for displaying the symbols being not originally included in the content data;

means for displaying the symbols at positions corresponding to the identified display objects to be selected by the user based on the data for displaying symbols;

means for receiving a wireless signal indicative of a symbol from the display selection device; and, means for specifying one display object based on the received wireless signal indicative of the symbol.

* * * * *